US008923823B1

(12) United States Patent
Wilde (10) Patent No.: US 8,923,823 B1
(45) Date of Patent: Dec. 30, 2014

(54) SYSTEM FOR DELIVERING AND CONFIRMING RECEIPT OF NOTIFICATION MESSAGES ACROSS DIFFERENT NOTIFICATION MEDIA

(75) Inventor: Erik Thomas Wilde, Berkeley, CA (US)

(73) Assignee: EMC Corporation, Hopkinton, MA (US)

( * ) Notice: Subject to any disclaimer, the term of this patent is extended or adjusted under 35 U.S.C. 154(b) by 2 days.

(21) Appl. No.: 13/536,787

(22) Filed: Jun. 28, 2012

(51) Int. Cl.
*H04M 1/663* (2006.01)

(52) U.S. Cl.
USPC .......................... 455/412.2; 455/509; 370/432

(58) Field of Classification Search
CPC . H04L 12/587; H04L 12/5875; H04L 12/589; H04L 61/10; H04L 61/106; H04W 68/00
USPC .......................... 455/412.1, 0.2, 509; 370/432
See application file for complete search history.

(56) References Cited

U.S. PATENT DOCUMENTS

| 7,509,304 | B1 * | 3/2009 | Pather et al. ........................... 1/1 |
| 8,478,310 | B2 * | 7/2013 | Reding et al. ................. 455/466 |
| 2005/0266879 | A1 * | 12/2005 | Spaur et al. ................ 455/556.2 |
| 2006/0075105 | A1 | 4/2006 | Momtchilov et al. |
| 2009/0181646 | A1 | 7/2009 | Bouazizi |
| 2010/0151782 | A1 | 6/2010 | Sato et al. |
| 2010/0161722 | A1 | 6/2010 | Jeon et al. |
| 2011/0191798 | A1 | 8/2011 | Bassali et al. |
| 2012/0015630 | A1 | 1/2012 | Ryali et al. |
| 2012/0094637 | A1 | 4/2012 | Jeyaseelan et al. |
| 2012/0204191 | A1 * | 8/2012 | Shia et al. ...................... 719/318 |
| 2012/0311046 | A1 | 12/2012 | Grigoriev |
| 2013/0061046 | A1 * | 3/2013 | Joy et al. ........................ 713/162 |

* cited by examiner

*Primary Examiner* — Christopher M Brandt
*Assistant Examiner* — Joseph Dean, Jr.
(74) *Attorney, Agent, or Firm* — Van Pelt, Yi & James LLP (57) ABSTRACT

The system for delivering and confirming receipt of notification messages across different notification media comprises a processor. The processor is configured to: receive an indication of a new notification handle on a new notification channel from a content provider; use a mapping and the universal notification channel to provide the new notification handle to one or more platform notification services, wherein the new notification handle is sent to each of the one or more platform notification services through a communication module specific to that notification service; and for each user registered to the notification channel: in the event that a notification handle acknowledgement is received: add an indication that the user acknowledged the message to an acknowledgement database; and in the event that a notification handle acknowledgement is not received: provide the notification handle to the user again. A memory is coupled to the processor and configured to store instructions.

17 Claims, 10 Drawing Sheets

Mapping Table

| Universal Notification Channel ID | Platform 1 Notification Service ID | Platform 2 Notification Service ID | Platform 3 Notification Service ID |
|---|---|---|---|
| Client 1; ID 22 | 20945 | 11552 | 4699 |
| Client 1; ID 49 | 89899 | 32203 | 5006 |
| Client 1; ID 78 | 40771 | 88705 | 8944 |
| Client 2; ID 35 | 28044 | 34395 | 9856 |
| Client 2; ID 42 | 95017 | 84571 | 161 |
| Client 3; ID 4 | 59233 | 10177 | 5068 |
| Client 4; ID 9 | 28392 | 77147 | 6867 |

Fig. 4A

Acknowledgment Database — 450

| Message ID | Platform 1 Serial QJDI94K | Platform 1 Serial PXJP72B | Platform 1 Serial MNFK53A | ... |
|---|---|---|---|---|
| 429348747 | X | X | X | |
| 429348748 | X | | | |
| 429348749 | X | X | X | |
| 429348750 | X | X | | |
| 429348751 | X | X | | |
| 429348752 | | | X | |
| 429348753 | X | X | X | |
| 429348754 | | X | X | |
| 429348755 | X | X | | |
| 429348756 | X | X | X | |
| 429348757 | X | X | X | |
| 429348758 | X | X | X | |
| 429348759 | X | X | X | |
| 429348760 | | X | | |
| 429348761 | X | X | | |
| 429348762 | X | X | X | |
| 429348763 | X | | X | |
| 429348764 | X | X | X | |
| 429348765 | X | X | | |
| 429348766 | X | X | X | |

SYSTEM FOR DELIVERING AND CONFIRMING RECEIPT OF NOTIFICATION MESSAGES ACROSS DIFFERENT NOTIFICATION MEDIA

BACKGROUND OF THE INVENTION

Many systems exist for delivery of notification messages. They are useful for both business applications (e.g., delivering updates on a software bug tracking system, delivering stock quotes, delivering appointment reminders) and consumer applications (e.g., delivering news updates, delivering sports results, delivering event reminders). In the past, systems delivered reminders either via a push system (e.g., simple mail transfer protocol (SMTP) email transfer, short message service (SMS)) or a user retrieval based system (e.g., feeds using resource description framework site summary (RSS) or Atom format for web feeds). Delivering messages in either of these ways is relatively straightforward, a content provider for a push system needs to maintain a user list and deliver the message to all users; a content provider for a user retrieval system need only publish the messages in a predetermined location using a predetermined format. Modern users demand messages delivered to their mobile smart phones. Different smart phone manufacturers each provide a notification delivery service for their branded phones, each notification delivery service operating using different protocols and different message types, and often provided as a service by the phone manufacturers or phone operating system manufacturers themselves.

Some systems for delivery of notification messages, rather than working with relatively trivial notifications (e.g., sports results, activity reminders, etc.), deal primarily with crucial notifications (e.g., corporate meeting reminders, network system administrator emergency messages, etc.) that must be guaranteed to arrive.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for delivering and confirming receipt of notification messages across different notification media is disclosed. The system for delivering and confirming receipt of notification messages across different notification media comprises a processor and a memory. The processor is configured to: receive an indication of a new notification handle on a new notification channel from a content provider; use a mapping and the universal notification channel to provide the new notification handle to one or more platform notification services, wherein the new notification handle is sent to each of the one or more platform notification services through a communication module specific to that notification service; and for each user registered to the notification channel: in the event that a notification handle acknowledgement is received: add an indication that the user acknowledged the message to an acknowledgement database; and in the event that a notification handle acknowledgement is not received: provide the notification handle to the user again. The memory is coupled to the processor and configured to store instructions for the processor.

In some embodiments, a system for delivering and confirming receipt of notification messages across different notification media delivers notification messages to a set of users. In some embodiments, the set of users comprises a set of users using smart phones, different subsets of the set of smart phones comprising smart phones using different operating systems (e.g., Apple iPhones, Google Android phones, RIM Blackberry phones, Windows Phone phones, etc.). Each operating system manufacturer maintains a platform notification service specific to the operating system (e.g., Apple maintains an iPhone specific platform notification service; Google maintains an Android specific platform notification service). Each platform notification service can create a new platform notification channel, add subscribers to the platform notification channel, and deliver messages to the subscribers on the platform notification channel. A system for delivering notification messages across different notification media (e.g., a universal notification service) receives a request from a content provider to create a new universal notification channel across different notification media. The universal notification service requests creation of a new platform notification channel on each platform notification service and maintains a mapping table linking the universal notification channel to the platform notification channels created on each platform notification service. It then provides the set of platform notification channel identifiers to the content provider so the content provider can advertise them to users. When the content provider wishes to deliver a new content item, it provides the content item to the universal notification service, which uses the mapping table to deliver it to each platform notification service. The platform notification services then deliver the messages to subscribed users of the platform notification channels. In some embodiments, the messages delivered to subscribed users of the platform notification channels are not complete messages but indications of messages, if a user receives an indication of a message and is interested in retrieving the complete message, he may follow an included link to retrieve the complete message from the content provider.

In some embodiments, the system for delivering and confirming receipt of notification messages across different notification media additionally comprises an acknowledgement database. In some embodiments, the acknowledgement database includes an entry (e.g., a column) for each user of each notification channel and an entry (e.g., a row) for each notification sent. In some embodiments, the database would have rows for users and notifications and another row referencing those two by identifiers. The row referencing the two others using identifiers also would indicate whether message x has or hasn't been delivered to user y. User software is configured to send an acknowledgement to the universal notification service upon receiving a notification. Each time the universal notification service receives an acknowledgement it makes an indication into the acknowledgement database, keeping track of which notifications have been received by which users. At periodic intervals (e.g., once an hour, once a day, etc.) the universal notification service checks the acknowledgement database for notifications where no corresponding acknowledgement has been received (e.g., indicating that the notification has not been received by the user). Any notice for which a corresponding acknowledgement has not been received is then resent to the user.

In some embodiments, the new notification handle is sent to one of the one or more platform notification services through the communication module corresponding to the one of the one or more platform notification services. In some embodiments, the universal notification channel is associated with a subscription request. In some embodiments, a platform notification channel identifier corresponds to the universal notification channel. In some embodiments, the notification handle is used to retrieve a full notification associated with the notification handle, wherein the full notification is sourced from the content provider. In various embodiments, the full notification is achieved using a link, the full notification is achieved using an application, the full notification is achieve using a web site, or any other appropriate want to achieve the notification. In some embodiments, the platform notification service of the one or more platform notification services comprises a smart phone operating system developer. In various embodiments, smart phone operating system developer comprises an Apple push notification service, an Android push notification service, a Windows Phone push notification service, a Blackberry push notification service, or any other appropriate service. In some embodiments, the mapping uses an identifier for the new universal notification channel. In some embodiments, the acknowledgement database stores information regarding the notification handle. In some embodiments, the information regarding the notification handle is stored associated with a user. In some embodiments, the information regarding the notification handle includes a fail indication indicating that the notification handle acknowledgement was not received. In some embodiments, the information regarding the notification handle includes a plurality of fail indications indicating that a plurality of notification handle acknowledgements were not received.

In some embodiments, the system is capable of determining whether messages have been received by each user and resending messages in the event they have not been received.

Figure 1:
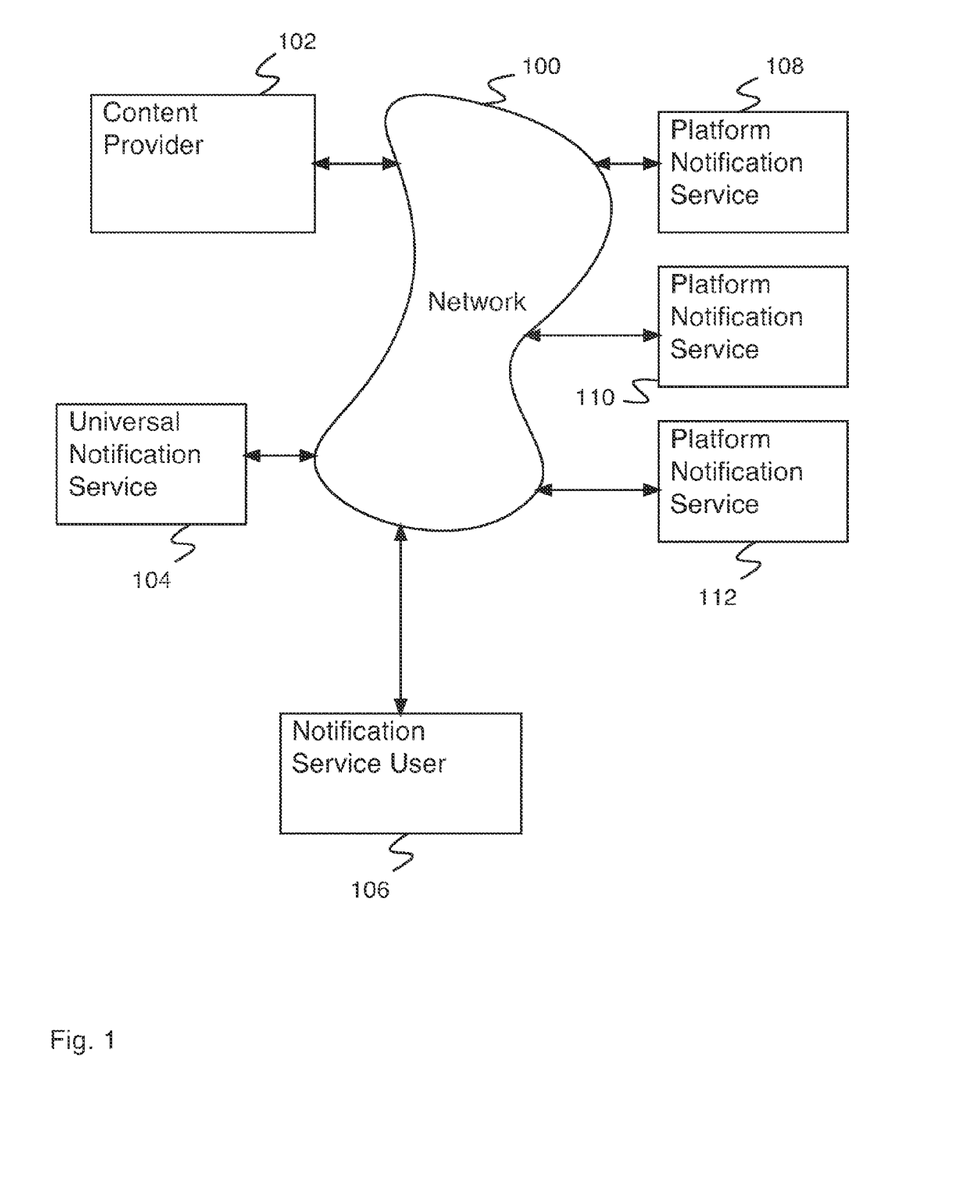
FIG. 1 is a block diagram illustrating an embodiment of a system for delivering and confirming receipt of notification messages across different notification media.

FIG. 1 is a block diagram illustrating an embodiment of a system for delivering and confirming receipt of notification messages across different notification media. In the example shown, FIG. 1 comprises Network 100. In various embodiments, network 100 comprises one or more of the following: a local area network, a wide area network, a wired network, a wireless network, the Internet, or any other appropriate communication network. In some embodiments, network 100 comprises several different networks that are used for communication between elements of the system. The system comprises content provider 102, universal notification service 104, notification service user 106, platform notification service 108, platform notification service 110, and platform notification service 112 communicate via network 100. Content provider 102 comprises a content provider providing a feed of content to users. For example, content provider 102 comprises an online news service, a reminder service, a business department, or any other appropriate content provider. Content provider 102 comprises a content provider desiring to deliver notification messages across different notification media. Notification service user 106 comprises a notification service user receiving notifications via a notification service. In some embodiments, notification service user 106 comprises a user receiving notifications on a mobile phone (e.g., a smart phone). In some embodiments, notification service user 106 comprises a user receiving notifications from a platform notification service (e.g., one of platform notification service 108, platform notification service 110, and platform notification service 112) specific to the operating system of the user's mobile phone. In some embodiments, notification service user 106 receives notifications via a delivery network. In various embodiments, the delivery network connects notification service user 106 to a wide area network, to a local area network, to the Internet, or to any appropriate network. In some embodiments, the delivery network comprises network 100. In some embodiments, notification service user 106 comprises a user desiring to receive notifications from a content provider (e.g., content provider 102). In various embodiments, there are 1, 100, 222, 1369, or any other appropriate number of notification service users in the system for delivering notification messages across different notification media. In the example shown, platform notification service 108, platform notification service 110, and platform notification service 112 comprise platform notification services for delivering notifications to notification service users (e.g., notification service user 106). For example, each of platform notification service 108, platform notification service 110, and platform notification service 112 comprise platform notification services associated with a smart phone operating system developer (e.g., Apple™ Push Notification Service, Android™ Cloud to Device Messaging Service, Windows™

Phone Push Notification Service, Blackberry™ Push Notification Service, SMS, etc.) for delivering notifications to notification service users using smart phones and using the associated smart phone operating system. In the example shown, universal notification service 104 comprises a system for delivering and confirming receipt of notification messages across different notification media. In some embodiments, universal notification service 104 comprises a system for communicating with content provider 102 and platform notification service 108, platform notification service 110, and platform notification service 112. In some embodiments, universal notification service 104 comprises a system for allowing a content provider (e.g., content provider 102) to deliver content across multiple platform notification services (e.g., platform notification service 108, platform notification service 110, and platform notification service 112) while treating them as a single notification service. In some embodiments, when content provider 102 wants to distribute a notification, it transmits the notification to universal notification service 104 associated with a universal notification channel on which to transmit the notification. Universal notification service 104 determines the appropriate platform notification channel for each platform notification service, and transmits the notification to platform notification service 108, platform notification service 110, and platform notification service 112, using appropriate communication protocols for each platform notification service. Platform notification service 108, platform notification service 110, and platform notification service 112 each determine a list of notification service users subscribed to their platform notification channel, and transmit the message to each notification service user, including notification service user 106, if appropriate.

When notification service user 106 identifies a universal notification channel that he wishes to subscribe to (e.g., on the website of content provider 102, on a service provided by platform notification service 108, etc.), the user is directed both to an interface to register with the appropriate platform notification service and also to an interface to register with universal notification service 104. When notification service user 106 registers with universal notification service 104, an identifier corresponding to notification service user 106 (e.g., a serial number, network address, SIM card number, etc.) is added to an acknowledgement database stored by universal notification service 104. In some embodiments, when notification service user 106 indicates to subscribe to a universal notification channel, user information is automatically sent to universal notification service 104, automatically registering the user with universal notification service 104.

Software used by notification service user 106 is configured such that when notification service user 106 receives a notification (e.g., from a platform notification service), it immediately responds by sending an acknowledgement to universal notification service 104. Each time universal notification service 104 delivers a notification (e.g., via platform notification service 108, platform notification service 110, and platform notification service 112) it expects to receive acknowledgements from each notification service user that are then recorded in the acknowledgement database. At periodic intervals (e.g., once an hour, once a day, etc.) universal notification service 104 checks the acknowledgement database for notifications where no corresponding acknowledgement has been received (e.g., indicating that the notification has not been received by the user). Any notice for which a corresponding acknowledgement has not been received is then resent by universal notification service 104 to the appropriate notification service user.

In some embodiments, different networks are used for different parts of the system; for example, a message is sent to the service, which may contact a SMS gateway, that will then send actual notification to users via a global system for mobile communications (GSM) network. On the other hand, separate networks, delivery networks, connect the users to the platform services.

Figure 2:
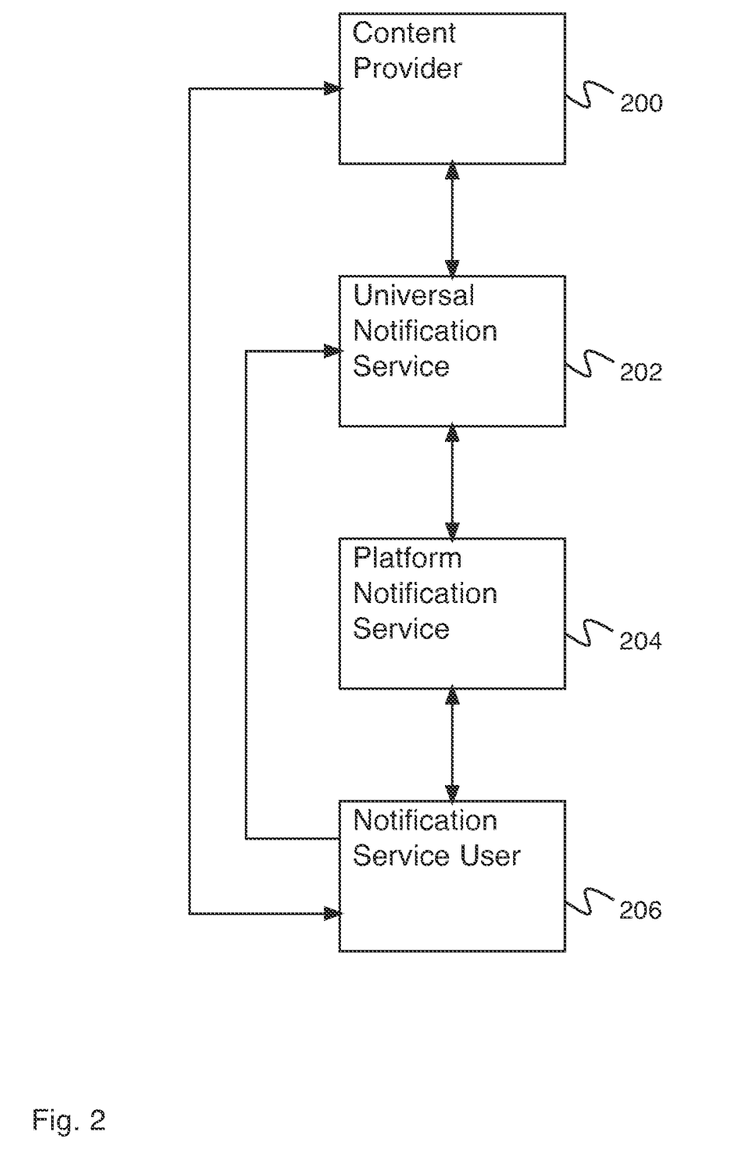
FIG. 2 is a block diagram illustrating an embodiment of communication paths in a system for delivering notification messages across different notification media.

FIG. 2 is a block diagram illustrating an embodiment of communication paths in a system for delivering notification messages across different notification media. In some embodiments, the system for delivering notification messages across different notification media comprises the system for delivering notification messages across different notification media of FIG. 1. In the example shown, content provider 200 communicates with universal notification service 202. In various embodiments, content provider 200 communicates with universal notification service 202 to request creation of a new universal notification channel, to receive platform notification channel identifiers, to deliver a new notification handle associated with a universal notification channel, to send user information to register the user with an acknowledgement database, or for any other appropriate purpose. Universal notification service 202 communicates with platform notification service 204. In some embodiments, universal notification service 202 communicates with more than one platform notification service. In various embodiments, universal notification service 202 communicates with platform notification service 204 to request creation of a new platform notification channel, to receive a platform notification channel identifier, to deliver a new notification handle associated with a platform notification channel, or for any other appropriate purpose. Platform notification service 204 communicates with notification service user 206. In some embodiments, platform notification service 204 communicates with more than one notification service user. In various embodiments, platform notification service 204 communicates with notification service user 206 to receive a subscription request, to deliver a new notification handle, or for any other appropriate purpose. Notification service user 206 communicates with content provider 200. In various embodiments, notification service user 206 communicates with content provider 200 to receive a platform notification channel identifier, to request a notification based on a new notification handle, to receive a notification, or for any other appropriate purpose. Notification service user 206 additionally communicates with universal notification service 202. In some embodiments, notification service user 206 communicates with universal notification service 202 to deliver an acknowledgement (e.g., an acknowledgement of receipt of a notification via platform notification service 204).

Figure 3:
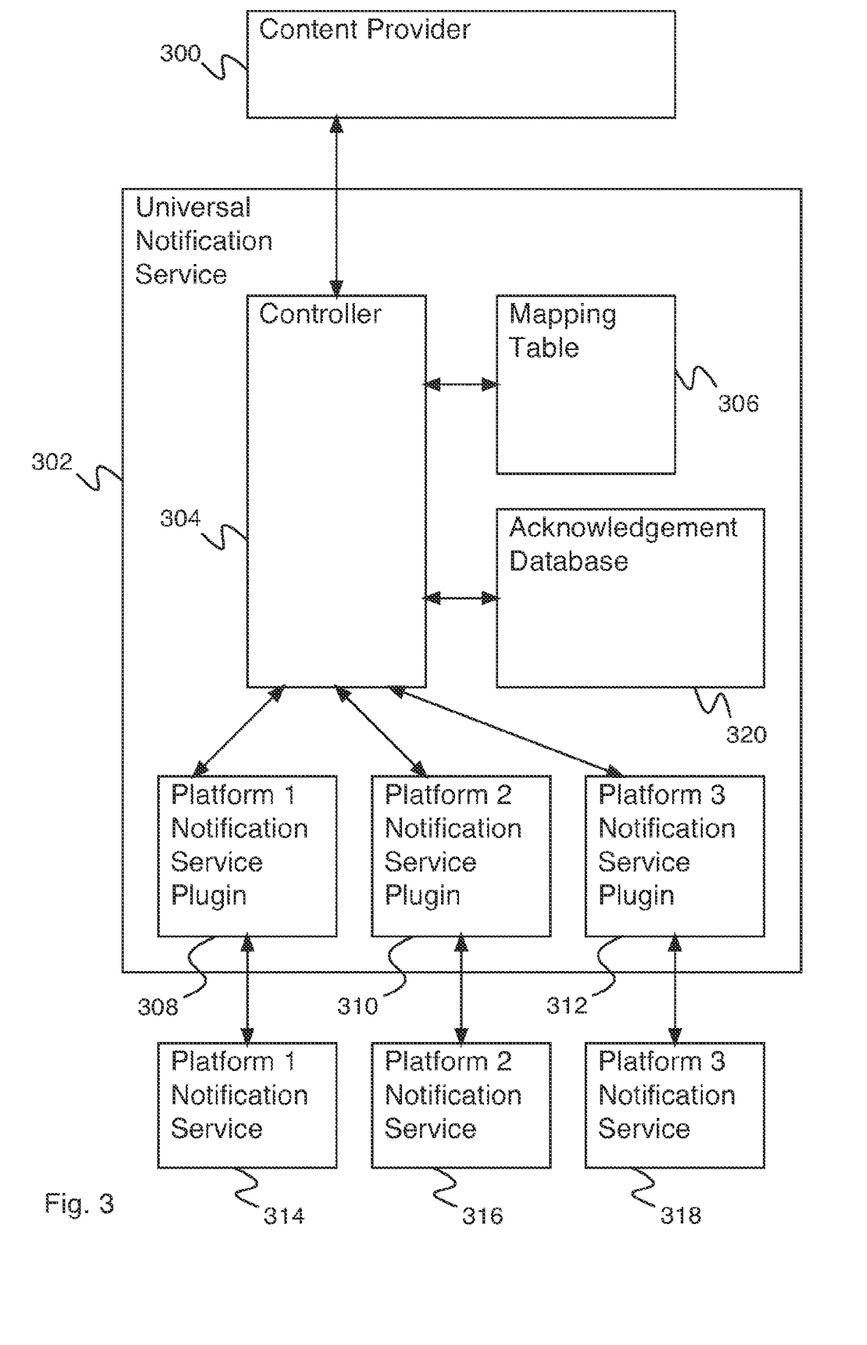
FIG. 3 is a block diagram illustrating an embodiment of a universal notification service.

FIG. 3 is a block diagram illustrating an embodiment of a universal notification service. In some embodiments, universal notification service 302 comprises universal notification service 104 of FIG. 1. In the example shown, universal notification service 302 communicates with content provider 300 and platform 1 notification service 314 (e.g., a platform notification service for platform 1), platform 2 notification service 316 (e.g., a platform notification service for platform 2), and platform 3 notification service 318 (e.g., a platform notification service for platform 3). Universal notification service 302 comprises controller 304, mapping table 306, acknowledgement database 320, platform 1 notification service plugin 308, platform 2 notification service plugin 310, and platform 3 notification service plugin 312. Controller 304 communicates with content provider 300, e.g., to receive a request for a new universal notification channel, to receive a new notification handle, etc. Controller 304 communicates with platform 1 notification service 314, platform 2 notification service 316, and platform 3 notification service 318 via platform 1 notification service plugin 308, platform 2 notification service plugin 310, and platform 3 notification service plugin 312, respectively. A platform notification service plugin (e.g., each of platform 1 notification service plugin 308, platform 2 notification service plugin 310, and platform 3 notification service plugin 312) serves as a communications translator, including all information required for communicating with the associated platform notification service (e.g., platform 1 notification service plugin 308 communicates with platform 1 notification service 314, etc.). Controller 304 delivers messages to each platform notification service plugin (e.g., new platform notification channel messages, new notification handle messages, etc.) and the platform notification service plugin formats the message accordingly and delivers it to its associated notification service according to the appropriate protocol. In the event that a new notification service is added to the system for delivering notification messages across different notification media (e.g., a new smart phone operating system is introduced which the universal notification service needs to deliver notifications to), a new associated platform notification service plugin can be developed and added to universal notification service 302, enabling the system to deliver notifications to the new notification service without changing the operation of controller 304.

When content provider 300 requests a new universal notification channel from universal notification service 302, controller 304 receives the request, generates a universal notification channel ID and in turn requests platform notification channels from each of platform 1 notification service 314, platform 2 notification service 316, and platform 3 notification service 318, via platform 1 notification service plugin 308, platform 2 notification service plugin 310, and platform 3 notification service plugin 312, respectively. Each platform notification service creates the new platform notification channel and returns the platform notification channel ID to universal notification service 302. Controller 304 receives the platform notification channel IDs (via the platform notification service plugins) and creates a mapping from the universal notification channel ID to the received platform notification channel IDs. The mapping is stored in mapping table 306, allowing controller 304 to deliver a new notification handle to the appropriate platform notification channels for a given universal notification channel. Controller 304 additionally delivers the set of platform notification channel IDs to content provider 300, allowing content provider 300 to advertise the platform notification channel IDs to notification system users, allowing the notification system user to discover a notification channel on a content provider system (e.g., on a content provider website) and register for the appropriate platform notification channel on the appropriate platform notification service.

In some embodiments, when a notification service user registers with universal notification service 302 to receive notifications on a universal notification channel, an entry corresponding to the user is added to acknowledgement database 320. Each time the notification service user receives a notification on the universal notification channel (e.g., via a platform notification channel), the user sends an acknowledgement to universal notification service 302. When the acknowledgement is received, the associated user ID and acknowledgement ID are looked up in acknowledgement database 320 and a corresponding indication is added, enabling controller 304 to track which notifications have been acknowledged by which users. In some embodiments, acknowledgments comprising a user ID and an acknowledgment ID are received from content provider 300. In some embodiments, when content provider 300 delivers an acknowledgement to universal notification service 302 in response to receiving a request for a notification based on a new notification handle.

In some embodiments, delivery is unreliable, and there's no feedback (e.g., using SMS). In this case, a link can be sent that is specific to the user; the user then activates that link, so that the content provider knows that the user has read the message; the content provider can then update the notification column in the notification service. This enables acknowledgement in the case that a platform notification channel does not provide built-in acknowledgement features.

Figure 4A:
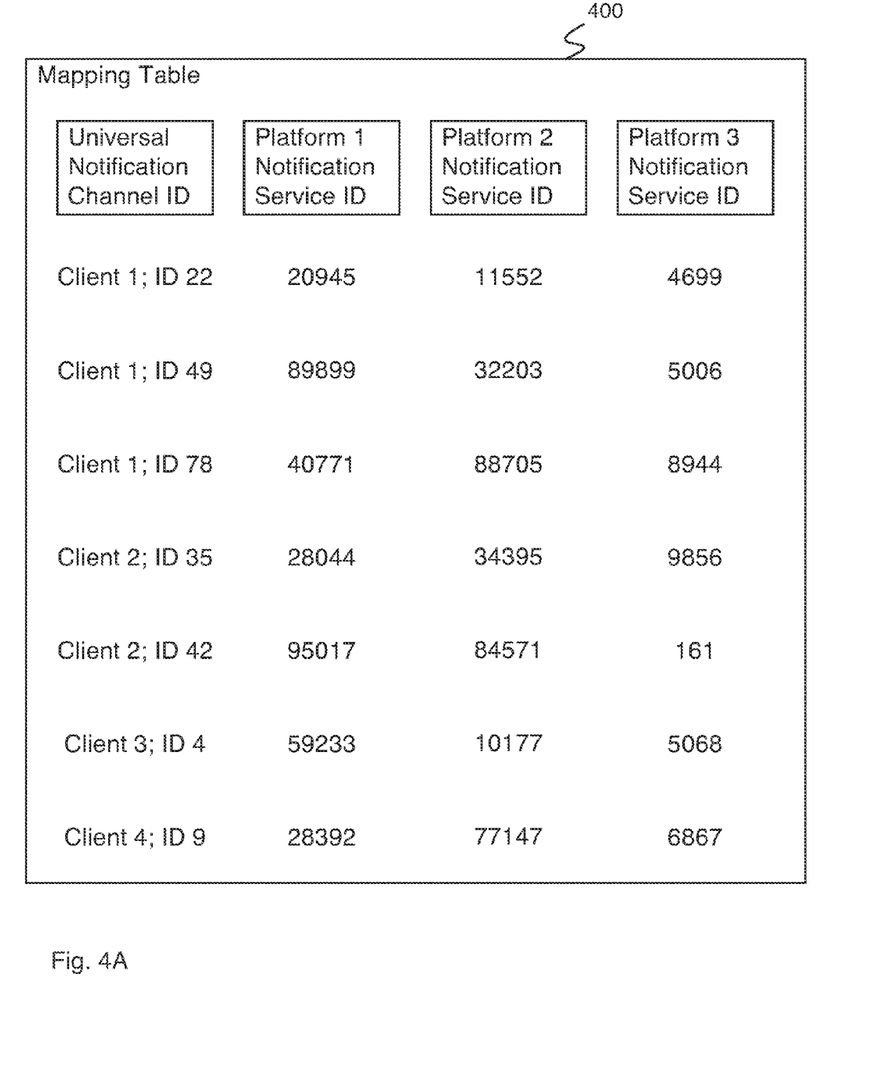
FIG. 4A is a diagram illustrating an embodiment of a mapping table.

FIG. 4A is a diagram illustrating an embodiment of a mapping table. In some embodiments, mapping table 400 comprises mapping table 306 of FIG. 3. In the example shown, mapping table 400 comprises a set of mappings of universal notification channel IDs to sets of platform notification service IDs. Each universal notification channel ID comprises a content provider identifier (e.g., "Client 1"; "Client 2"; etc.) and a content provider notification channel ID (e.g., "ID 22"; "ID 49"; etc.). In some embodiments, the universal notification service will only deliver notifications received from the content provider associated with the universal notification channel. In some embodiments, the universal notification service will deliver notifications received from any of a set of content providers indicated in the mapping table. In some embodiments, the universal notification service will deliver notifications from any content provider. Corresponding to each universal notification channel ID is a set of platform notification service IDs. Each platform notification service ID corresponds to a platform notification channel on a platform notification service. When a universal notification service controller receives a new notification handle from a content provider on a universal notification channel, it looks up the universal notification channel ID in the mapping table and retrieves the corresponding set of platform notification service IDs. Each notification service ID in the set of platform notification service IDs is sent along with the message handle to the appropriate platform notification service plugin, which communicates a properly formatted message to the associated platform notification service.

In some embodiments, there would be much more data managed in such a table—for example, all kind of housekeeping stuff. In some embodiments, the identifier spaces for the various platforms are different. In some embodiments, the channels would not need to be specific for just a client. In various embodiments, a channel would be open to various clients or even public, so that the user population addressed through that channel could be addressed by more than just one client, or any other appropriate configuration for the channel.

Figure 4B:
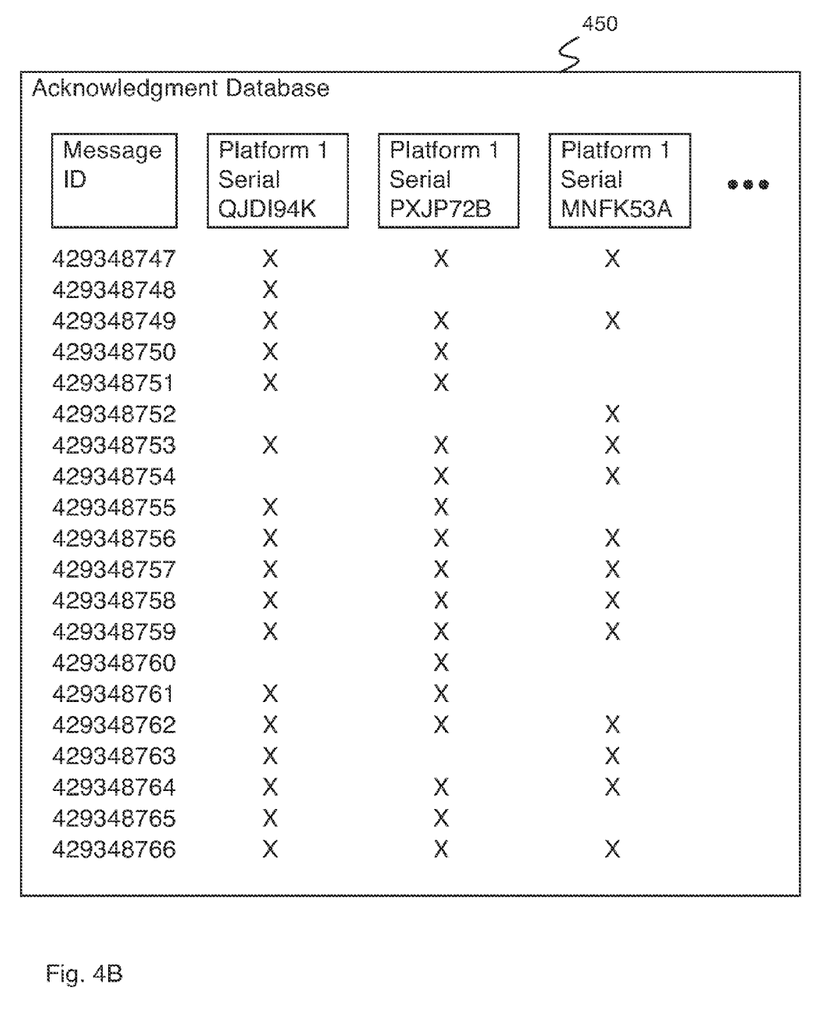
FIG. 4B is a diagram illustrating an embodiment of an acknowledgement database.

FIG. 4B is a diagram illustrating an embodiment of an acknowledgement database. In some embodiments, acknowledgement database 450 comprises acknowledgement database 320 of FIG. 3. In the example shown, acknowledgement database 450 comprises the acknowledgement database for a particular universal notification channel, e.g., the notifications tracked are all part of the same universal notification channel. In some embodiments, acknowledgment database 450 is one of a set of acknowledgment database pages comprising acknowledgment database 320 of FIG. 3, each page corresponding to a particular universal notification channel. Acknowledgement database 450 comprises a column corresponding to each notification service user registered with the universal notification system. Acknowledgement database 450 additionally comprises a row corresponding to each notification sent by the notification system. The cell at the intersection of each row and column comprises an indication corresponding to the acknowledgement status of the message for the user. An "X" indicates that the acknowledgement has been received by the universal notification system, and an empty cell indicates that the acknowledgement has not been received by the universal notification system. Acknowledgement database 450 is checked at a point or points in time after sending a notification, and any cell found to be empty indicates that the notification should be resent to the appropriate user.

In some embodiments, acknowledgement database 450 comprises the whole of the acknowledgement database and tracks all notifications on all universal notification channels for the universal notification service. When acknowledgement database 450 is configured in this way, a third entry is possible in each cell. All users and all notifications are present in this database, but not all notifications are intended to reach all users, e.g., some users are not registered for all universal notification channels. When a user is not registered for a universal notification channel, an indication is made to acknowledgement database 450 (e.g., an "N/A") that the user did not receive the notification but that it should not be resent to the user.

In some embodiments, acknowledgement database 450 records number of attempts to provide a message to a user (e.g., platform 1 serial QJDI94K, platform 1 serial PXJP72B, platform 1 serial MNFK53A, etc.). For example, acknowledgement database 450 stores an entry indicating a number of attempts to convey a message (e.g., an integer indicating attempts).

In some embodiments, the database would have rows for users, rows for notifications, and rows referencing between the users and the notifications by identifiers. The row referencing two others using identifiers would indicate that message x referenced in row r_x has or hasn't been delivered to user y referenced in row y_r.

Figure 5:
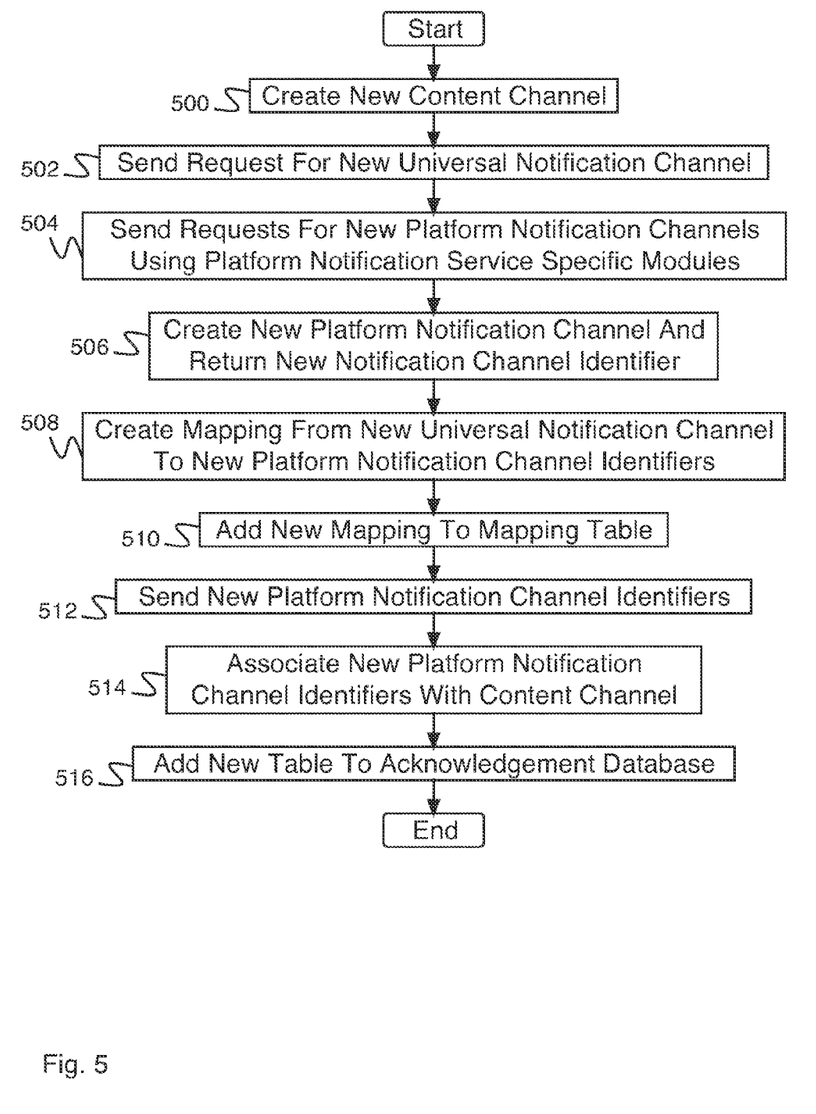
FIG. 5 is a flow diagram illustrating an embodiment of a process for creating a new universal notification channel.

FIG. 5 is a flow diagram illustrating an embodiment of a process for creating a new universal notification channel. In some embodiments, the process of FIG. 5 comprises a process of creating a new universal notification channel on a universal notification service (e.g., universal notification service 104 of FIG. 1) for allowing a content provider (e.g., content provider 102 of FIG. 1) to deliver content to multiple notification service users (e.g., notification service user 106 of FIG. 1) via multiple platform notification services (e.g., platform notification service 108 of FIG. 1, platform notification service 110 of FIG. 1, and platform notification service 112 of FIG. 1). In the example shown, in 500, a new content channel is created. For example, a new content channel is created by a content provider (e.g., an online news service, a reminder service, a business department, an online bug tracking system, etc.). In various embodiments, a new content channel may comprise a news channel (e.g., current results from the French Open, current news about Sudan, etc.), a reminder service channel (e.g., current meeting time updates for the software development group, rehearsal time updates for a theater group, etc.), or any other appropriate new content channel. In 502, a request for a new universal notification channel is sent. For example, a request for a new universal notification channel is sent from the content provider to the universal notification service. In some embodiments, the universal notification channel comprises a distribution channel for the content channel (e.g., the content channel created in 500). In 504, requests for new platform notification channels are sent using platform notification service specific modules. For example, requests for new platform notification channels are sent from the universal notification service to each of the multiple platform notification services (e.g., Apple Push Notification Service, Android Cloud to Device Messaging Service, Windows Phone Push Notification Service, Blackberry Push Notification Service, SMS, etc.). In some embodiments, a platform notification service specific module exists for each platform notification service. In some embodiments, each platform notification service specific module comprises information enabling communication with the platform notification service.

In 506, a new platform notification channel is created and a new notification channel identifier is returned. For example, a new notification channel is created by each of the platform notification services, and the new notification channel identifiers are returned to the universal notification service. The new platform notification channels each correspond to a platform specific version of the universal notification channel (e.g., the universal notification channel requested in 502). In 508, a mapping is created from the new universal notification channel to the new platform notification channel identifiers. For example, a mapping is created by the universal notification service. In some embodiments, a mapping from the new universal notification channel to the new platform notification channel identifiers comprises a correspondence between a new universal notification channel identifier and the new platform notification channel identifiers. In 510, the new mapping entry is added to a mapping table. For example, the new mapping is added to the mapping table by the universal notification service. In some embodiments, adding the new mapping to the mapping table allows the universal notification service to retrieve the new platform notification channel identifiers given the new universal notification channel. In 512, new platform notification channel identifiers are sent. For example, the new platform notification channel identifiers are sent from the universal notification service to the content provider. In 514, new platform notification channel identifiers are associated with the content channel. For example, new platform notification channel identifiers are associated with the content channel by the content provider. In some embodiments, the content channel comprises the content channel created in 500. In some embodiments, associating the new platform notification channel identifiers with the content channel allows the content provider to redirect a user interested in subscribing to the content channel to the appropriate platform notification channel to receive the notifications on his mobile device. In 516, a new table is added to the acknowledgement database. For example, a new table is added to the acknowledgement database by the universal notification service. In some embodiments, the new table of the acknowledgement database comprises a table of the acknowledgment database associated with the new universal notification channel. In some embodiments, acknowledgments of notifications delivered on the new notification channel are stored in the new table added to the acknowledgement database.

Figure 6:
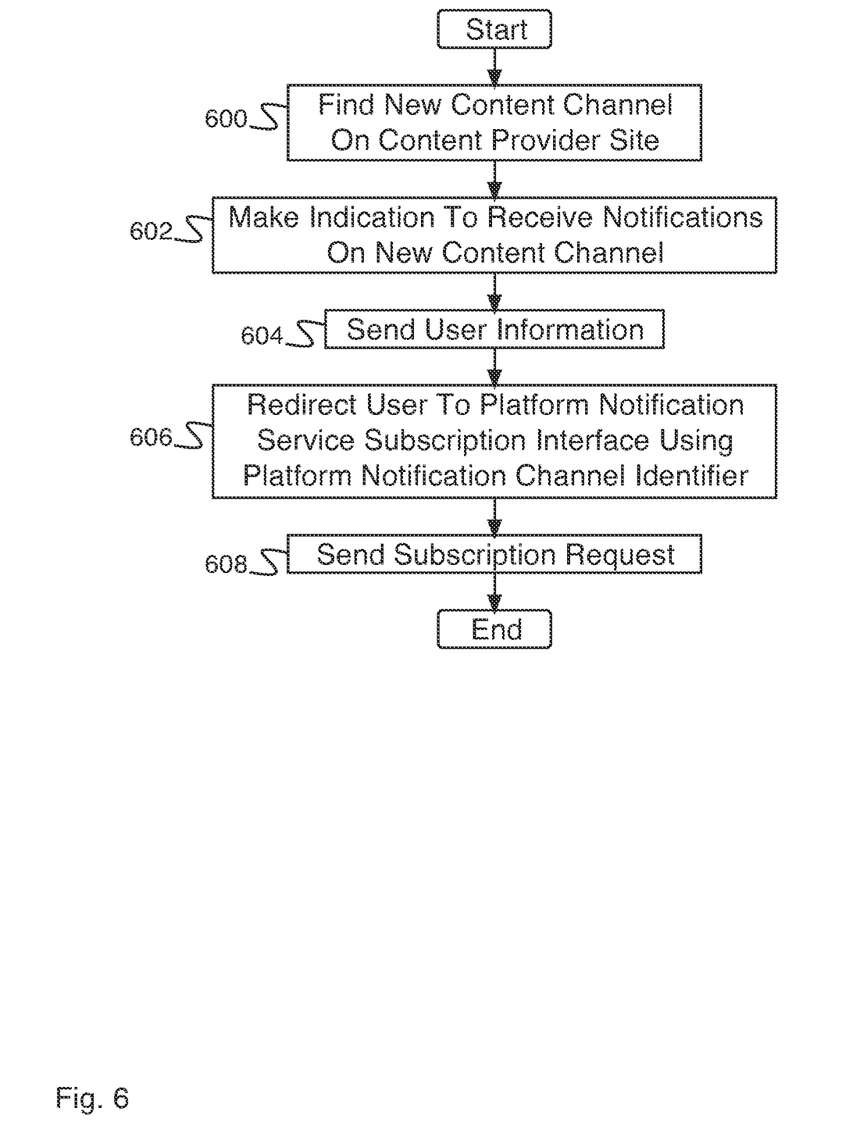
FIG. 6 is a flow diagram illustrating an embodiment of a process for subscribing to a content channel.

FIG. 6 is a flow diagram illustrating an embodiment of a process for subscribing to a content channel. In some embodiments, the process of FIG. 6 comprises a process of a notification service user (e.g., notification service user 106 of FIG. 1) subscribing to a content channel of a content provider (e.g., content provider 102 of FIG. 1) via a platform notification service (e.g., platform notification service 108 of FIG. 1, platform notification service 110 of FIG. 1, or platform notification service 112 of FIG. 1) In the example shown, in 600, a new content channel is found on a content provider site. For example, a new content channel is found on a content provider site by a notification service user. In various embodiments, a content provider site comprises a content provider website, a content provider smartphone app, a content provider standalone application, an email sent by the content provider, a newsgroup message posted by the content provider, or any other appropriate software or protocol site provided by the content provider. In some embodiments, the notification service user identifies the content channel while browsing the content provider site. In some embodiments, the notification service user navigates to the content provider site in order to find the content channel. In 602, an indication to receive notifications on the new content channel is made. For example, the indication to receive notifications on the new content channel is made by the notification service user. In some embodiments, making an indication to receive notifications on the new content channel comprises clicking a link. In some embodiments, making an indication to receive notifications on the new content channel happens mostly behind the scenes and not visible to a user; there are application programming interfaces (APIs) at work to perform the functionality and, while at some point in time some user interaction might occur, in most cases there is no direct "click on a link" connection. In some embodiments, the content provider site includes a set of links, each link specific to a particular mobile phone operating system. In some embodiments, the content provider site is able to automatically determine the mobile phone operating system in use by the notification service user and interpret the indication appropriately. In some embodiments, making an indication to receive notifications on the new content channel comprises selecting a platform notification channel identifier. In 604, user information is sent. For example, user information is sent from the content provider site to the universal notification service. In some embodiments, user information is sent from the content provider site to the universal notification site to register the user with an acknowledgement database. In 606, the user is redirected to a platform notification service subscription interface using a platform notification channel identifier. For example, the content provider redirects the user to a platform notification service subscription interface using a platform notification channel identifier. In some embodiments, the platform notification channel identifier comprises a platform notification channel identifier selected in 602. In some embodiments, the platform notification service subscription interface is specific to the mobile phone operating system in use by the notification service user. In 608, a subscription request is sent. For example, a subscription request is sent by the notification service user, using the platform notification service subscription interface. In some embodiments, sending a subscription request registers a user to receive notifications from a platform notification service.

Figure 7:
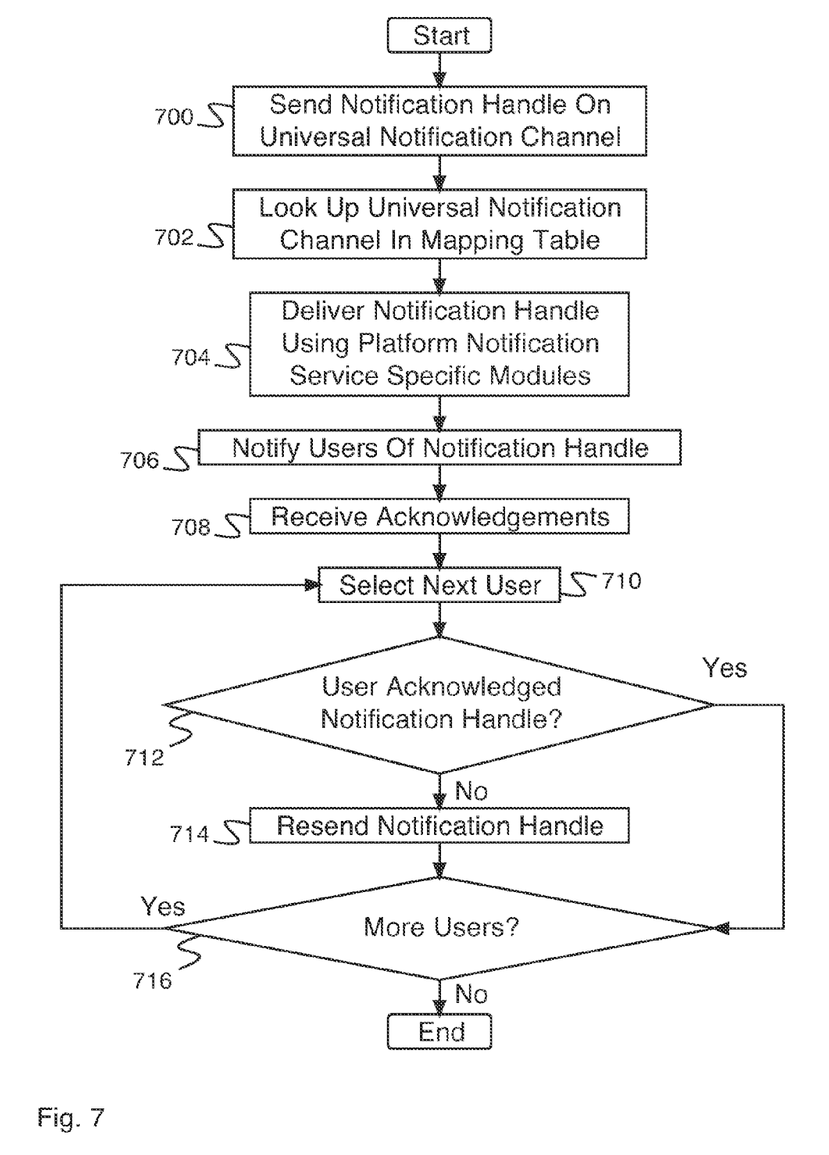
FIG. 7 is a flow diagram illustrating an embodiment of a process for distributing a notification.

FIG. 7 is a flow diagram illustrating an embodiment of a process for distributing a notification. In some embodiments, the process of FIG. 7 comprises a process for distributing a notification from a content provider (e.g., content provider 102 of FIG. 1) on a universal notification channel on a universal notification service (e.g., universal notification service 104 of FIG. 1) to a notification service user (e.g., notification service user 106 of FIG. 1) via a platform notification service (e.g., platform notification service 108 of FIG. 1, platform notification service 110 of FIG. 1, or platform notification service 112 of FIG. 1). In the example shown, in 700, a notification handle is sent on a universal notification channel. For example, a notification handle is sent by a content provider on an universal notification channel of a universal notification service. In various embodiments, a notification handle comprises an indication of a notification, a link to a notification, a summary of a notification, a notification of a notification, or any other appropriate message allowing a notification service user to retrieve a notification. In 702, the universal notification channel is looked up in the mapping table. For example, the universal notification channel is looked up in the mapping table by the universal notification service. In some embodiments, when the universal notification channel is looked up in the mapping table, platform notification channel identifiers are retrieved. In 704, the notification handle is delivered using platform notification service specific modules. For example, the notification handle is delivered to one or more platform notification services by the universal notification channel, using platform notification service specific modules. In some embodiments, platform notification channel identifiers are used to identify appropriate platform notification channels. In 706, users are notified of the notification handle. For example, users are notified of the notification handle by platform notification services. In some embodiments, notifying a user of a notification handle comprises sending a user a message including a notification handle. In some embodiments, a user can use the notification handle to retrieve an associated full notification, if desired. In some embodiments, the notification handle causes an automated download of the associated full notification. In 708, acknowledgements are received. For example, acknowledgements are received by the universal notification service from notification service users. In some embodiments, whenever a notification service user receives a notification handle, it sends an acknowledgement to the universal notification service. In some embodiments, for systems it is not technically feasible for all platforms (e.g., SMS) to send an acknowledgement; in these cases, one way of enabling acknowledgement is to let users retrieve something and have the user identifier (ID) embedded in the link used during retrieval. One the link is used the system knows then that the delivery was successful. Note that pure delivery of a message (e.g., of an SMS message) is not considered success by the system; an embedded link has to be acted upon to register the acknowledgement In 710, a next user is selected. For example, a next user is selected from the acknowledgement database by the universal notification service. In some embodiments, the next user comprises the first user. In 712, it is determined whether the user has confirmed acknowledged the notification handle. For example, the universal notification service determines whether the selected user has acknowledged the notification handle by examining the acknowledgement database. If it is determined that the user has not acknowledged the notification handle, control passes to 714. In 714, the notification handle is resent. For example, the notification handle is resent by the universal notification service to the user via a platform notification service. Control then passes to 716. If it is determined that the user has acknowledged the notification handle, control passes to directly to 716. In 716, it is determined whether there are more users. For example, the universal notification service determines whether there are more users in the acknowledgement database. If it is determined that there are more users in the acknowledgement database, control passes to 710. If it is determined that there are no more users in the acknowledgement database, the process ends. In some embodiments, 710 through 716 are repeated until all users have confirmed receipt. In some embodiments, the process waits an appropriate amount of time between the repeats of 710 through 716. In various embodiments, an appropriate amount of time comprises one minute, one hour, one day, or any other appropriate amount of time.

In some embodiments, it is determined whether a maximum number of notifications sent is reached; if it is determined whether the maximum number of notification sent is reached, the notification is not resent and a fail notification is noted in the database (e.g., the maximum number of tries is stored associated with the message).

Figure 8:
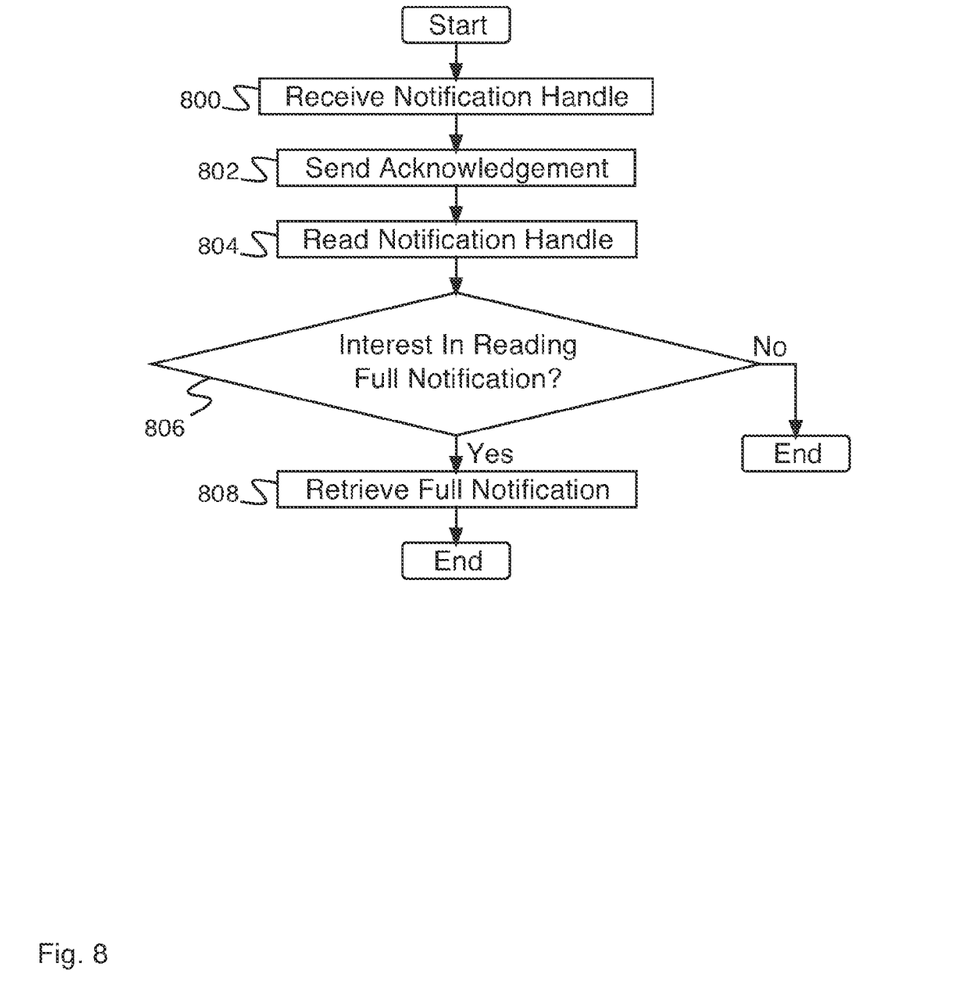
FIG. 8 is a flow diagram illustrating an embodiment of a process for receiving a notification handle.

FIG. 8 is a flow diagram illustrating an embodiment of a process for receiving a notification handle. In some embodiments, the process of FIG. 8 comprises a process for a notification service user (e.g., notification service user 106 of FIG. 1) receiving a notification handle provided by a content provider (e.g., content provider 102 of FIG. 1) on a platform notification service (e.g., platform notification service 108 of FIG. 1, platform notification service 110 of FIG. 1, or platform notification service 112 of FIG. 1). In the example shown, in 800, a notification handle is received. For example, a notification handle is received by a notification service user from a platform notification service. In 802, an acknowledgement is sent. For example, an acknowledgement is sent from the notification service user to the universal notification service. In 804, a notification handle is read. For example, the notification handle is read by a notification service user. In 806, it is determined if there is interest in reading the full notification. For example, it is determined if the notification service user is interested enough in the notification handle to read the associated full notification. If there is not interest in reading the full notification, the process ends. If there is interest in reading the full notification, control passes to 808. In 808, the full notification is retrieved. For example, the full notification is retrieved by the notification service user from the content provider. In various embodiments, the full notification is retrieved by the notification service user from the content provider by clicking a link, executing an application, navigating to a web site, or in any other appropriate way.

Figure 9:
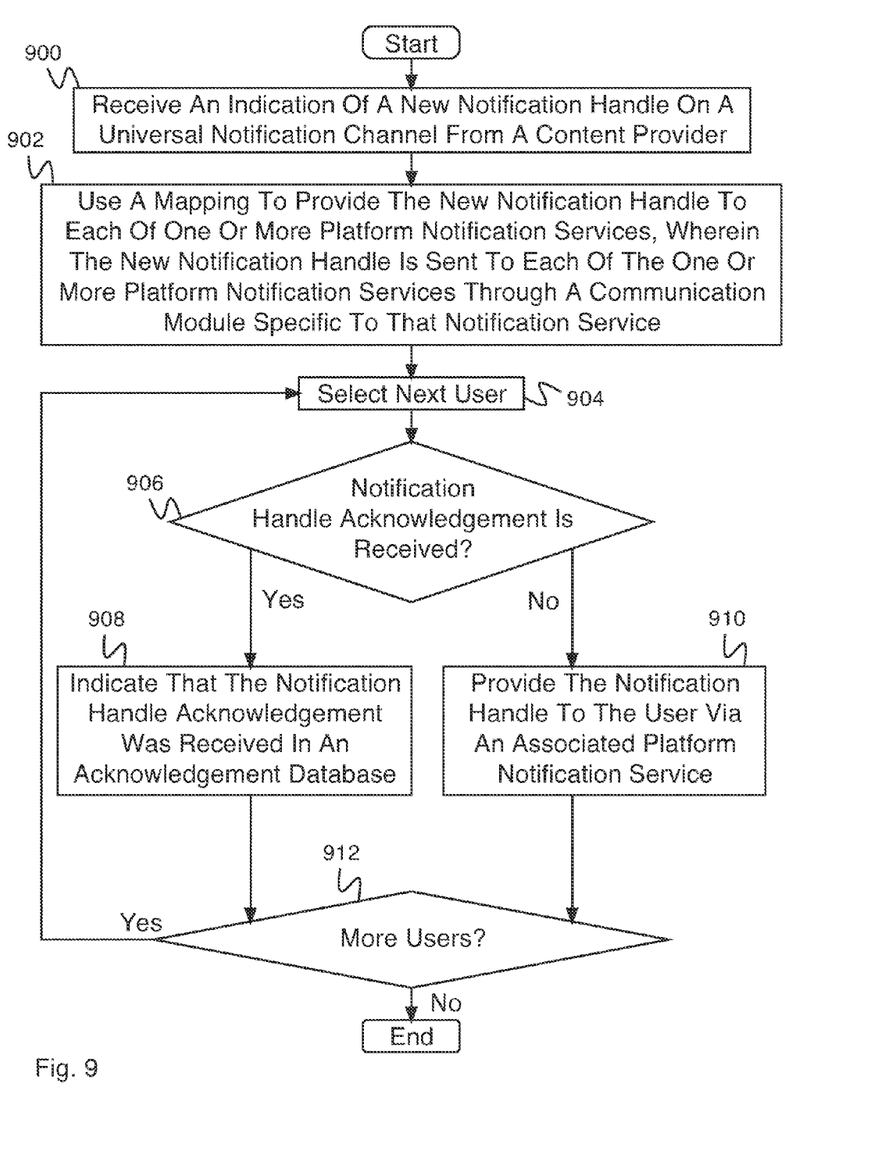
FIG. 9 is a flow diagram illustrating an embodiment of a process for delivering and confirming receipt of notification messages across different notification media.

FIG. 9 is a flow diagram illustrating an embodiment of a process for delivering and confirming receipt of notification messages across different notification media. In some embodiments, the process of FIG. 9 is executed by a universal notification service (e.g., universal notification service 104 of FIG. 1). In the example shown, in 900, the universal notification service receives an indication of a new notification handle on a universal notification channel from a content provider. In 902, the universal notification service uses a mapping to provide the new notification handle to each of one or more platform notification services, wherein the new notification handle is sent to each of the one or more platform notification services through a communication module specific to that notification service. In 904, a next user is selected. In some embodiments, the next user comprises the next user in an acknowledgement database. In some embodiments, the next user comprises a first user. In 906, it is determined whether a notification handle acknowledgement has been received. If it is determined that a notification handle acknowledgement has been received, control passes to 908. In 908, the universal notification service indicates that the notification handle acknowledgement was received in an acknowledgement database. Control then passes to 912. If it was determined in 906 that a notification handle acknowledgement is not received, control passes to 910. In 910, the universal notification service provides the notification handle to the user via an associated platform notification service. In some embodiments, an indication is stored in the acknowledgement database indicating that the message was not acknowledged. In some embodiments, the indication stored includes a count of the number of attempts. Control then passes to 912. In 912, the universal notification service determines if there are more users, e.g., if there are more users in the acknowledgement database. If it is determined that there are more users, control passes to 904. If it is determined that there are not more users, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for delivering and confirming receipt of notification messages across different notification media, comprising:
a processor configured to:
receive an indication of a request for a new universal notification channel from a content provider;
request one or more platform notification channels from one or more platform notification services;
create a mapping in a database of a universal channel identifier of the new universal notification channel and a platform notification channel identifier for each of the one or more platform notification channels on the one or more platform notification services;
register a user to receive a notification from the new universal notification channel, wherein registering comprises adding the user's information to an acknowledgement database table for the new universal notification channel in an acknowledgement database;
receive an indication of a notification handle from a content provider to be sent to registered users on the new universal notification channel;
for each user registered to the new universal notification channel:
provide the notification handle through the one or more platform notification services to each registered user;
in the event that a notification handle acknowledgement ID is received from a registered user:
indicate that the notification handle acknowledgement ID was received in the acknowledgment database table of the new universal notification channel; and
determine after an appropriate amount of time whether the notification handle acknowledgement ID is not received by checking the acknowledgment database table of the new universal notification channel; and
in the event the notification handle acknowledgment ID is not indicated in the acknowledgement database table, provide the notification handle to the user again; and
a memory coupled to the processor configured to store instructions for the processor.

2. A system of claim 1, wherein the notification handle is provided one of the one or more platform notification services through a communication module corresponding to the one of the one or more platform notification services.

3. A system as in claim 1, wherein the processor is further configured to send the platform notification channel identifier for each of the one or more platform notification channels on the one or more platform notification services back to the content provider.

4. A system as in claim 1, wherein the notification handle is used to retrieve a full notification associated with the notification handle, wherein the full notification is sourced from the content provider.

5. A system as in claim 1, wherein a platform notification service of the one or more platform notification services comprises a smart phone operating system developer.

6. A system as in claim 1, wherein the acknowledgement database stores information regarding the notification handle.

7. A system as in claim 1, wherein the acknowledgment database table stores a number of attempts to provide the notification handle to the user.

8. A system as in claim 4, wherein the full notification is achieved using a link.

9. A system as in claim 4, wherein the full notification is achieved using an application.

10. A system as in claim 4, wherein the full notification is achieve using a web site.

11. A system as in claim 5, wherein the smart phone operating system developer comprises an Apple push notification service.

12. A system as in claim 5, wherein the smart phone operating system developer comprises an Android push notification service.

13. A system as in claim 5, wherein the smart phone operating system developer comprises a Windows Phone push notification service.

14. A system as in claim 5, wherein the smart phone operating system developer comprises a Blackberry push notification service.

15. A system as in claim 7, wherein the number of attempts to provide the notification handle includes a plurality of fail indications indicating that a plurality of notification handle acknowledgements were not received.

16. A method of delivering and confirming receipt of notification messages across different notification media, comprising:
- receiving, using a processor, an indication of a request for a new universal notification channel from a content provider;
- requesting one or more platform notification channels from one or more platform notification services;
- creating a mapping in a database of a universal channel identifier of the new universal notification channel and a platform notification channel identifier for each of the one or more platform notification channels on the one or more platform notification services;
- registering a user to receive a notification from the new universal notification channel, wherein registering comprises adding the user's information to an acknowledgement database table for the new universal notification channel in an acknowledgement database;
- receiving an indication of a notification handle from a content provider to be sent to registered users on the new universal notification channel;
- for each user registered to the new universal notification channel:
  - provide the notification handle through the one or more platform notification services to each registered user;
  - in the event that a notification handle acknowledgement ID is received from a registered user:
    - indicating that the notification handle acknowledgement ID was received in the acknowledgment database table of the new universal notification channel; and
  - determining after an appropriate amount of time whether the notification handle acknowledgement ID is not received by checking the acknowledgment database table of the new universal notification channel; and
  - in the event the notification handle acknowledgment ID is not indicated in the acknowledgement database table, providing the notification handle to the user again.

17. A computer program product for delivering and confirming receipt of notification messages across different notification media, the computer program product being embodied in a non-transitory computer readable storage medium and comprising computer instructions for:
- receiving an indication of a request for a new universal notification channel from a content provider;
- requesting one or more platform notification channels from one or more platform notification services;
- creating a mapping in a database of a universal channel identifier of the new universal notification channel and a platform notification channel identifier for each of the one or more platform notification channels on the one or more platform notification services;
- registering a user to receive a notification from the new universal notification channel, wherein registering comprises adding the user's information to an acknowledgement database table for the new universal notification channel in an acknowledgement database;
- receiving an indication of a notification handle from a content provider to be sent to registered users on the new universal notification channel;
- for each user registered to the new universal notification channel:
  - provide the notification handle through the one or more platform notification services to each registered user;
  - in the event that a notification handle acknowledgement ID is received from a registered user:
    - indicating that the notification handle acknowledgement ID was received in the acknowledgment database table of the new universal notification channel; and
  - determining after an appropriate amount of time whether the notification handle acknowledgement ID is not received by checking the acknowledgment database table of the new universal notification channel; and
  - in the event the notification handle acknowledgment ID is not indicated in the acknowledgement database table, providing the notification handle to the user again.

* * * * *